April 13, 1954 N. McCLURE 2,675,463

TELEPHONE DIAL LIGHT

Filed Sept. 26, 1950

INVENTOR.
Natholean McClure
BY
ATTORNEY.

Patented Apr. 13, 1954 2,675,463

UNITED STATES PATENT OFFICE 2,675,463

TELEPHONE DIAL LIGHT

Natholean McClure, Kansas City, Mo.

Application September 26, 1950, Serial No. 186,877

1 Claim. (Cl. 240—2.17)

This invention relates to illuminating means for telephone sets, the primary object being to provide electrical apparatus attachable to a conventional subscriber's stand but separate therefrom for directing rays of light to the dial of the set each time the hand-set is removed from its cradle.

It is the most important object of the present invention to provide an illuminating apparatus as above set forth that includes a cover for the telephone stand having an opening that clears the calling dial and the finger wheel of the stand and having an electric circuit that includes incandescent lamps arranged to direct rays of light radially inwardly across the dial, the circuit additionally including switch means that automatically close the circuit whenever the hand-set is removed from its conventional cradle.

A further object is to provide an illuminating means that includes an annular lamp support that circumscribes the dial at the opening of the cover and having an internal slot for confining the rays of light to a predetermined area.

Many more minor objects will be made clear as the specification progresses, reference being had to the accompanying drawing, wherein.

Figure 1:
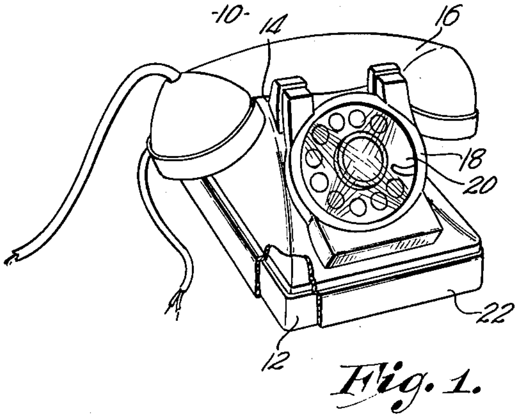
Figure 1 is a perspective view of a conventional subscriber's telephone set showing one form of telephone dial light made pursuant to the present invention.

The illuminating means forming the subject matter of this invention is attachable to a conventional telephone set broadly designated by the numeral 10 and including a subscriber's stand 12, having a cradle 14 for receiving a hand-set 16. Additionally, the telephone stand 12 is provided with a calibrated dial 18 on one face thereof and a finger wheel 20 is rotatably mounted on the stand 12 in superimposed relationship to dial 18.

The illuminating means of the present invention is mounted directly upon a cover 22 for the stand 12 that substantially hides the same and except for the dial 18 and the finger wheel 20 by means of a clearance opening 24 in the cover 22.

Figure 2:
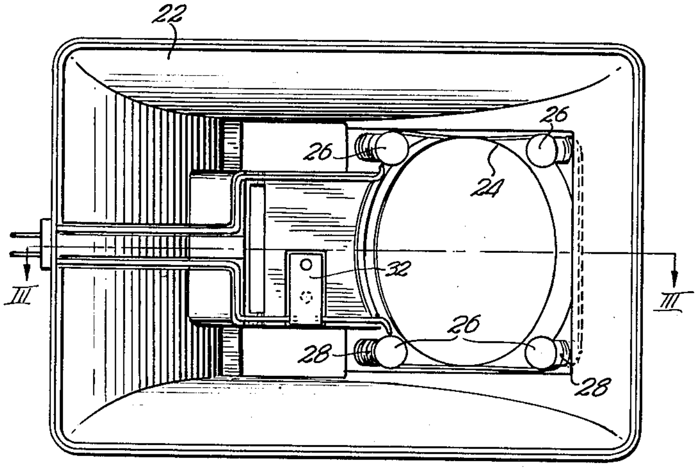
Fig. 2 is an inverted view of the dial light assembly per se.

There is provided a plurality of relatively small incandescent lamps 26 each mounted in a suitable socket 28 that are in turn secured in any suitable manner to the innermost face of cover 22 adjacent the opening 24. It is noted in Fig. 2 of the drawing particularly that the plurality of lamps 26 are arranged in circumscribing relationship to the opening 24 next adjacent thereto so as to direct light radially inwardly across the face of dial 18 when the lamps 26 are energized.

The lamps 26 are connected in series with the secondary of a current transformer 30 having its primary coupled with any suitable source of electrical energy not shown. Also in series with the lamps 26 and the secondary of transformer 30, is a switch 32 that is carried by a top wall 34 forming a part of the cover 22.

Figure 4:
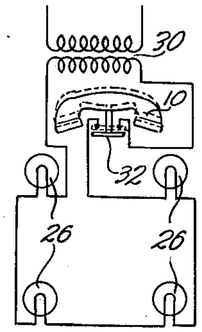
Fig. 4 is a schematic wiring diagram illustrating the electric circuit of the assembly.
Figure 3:
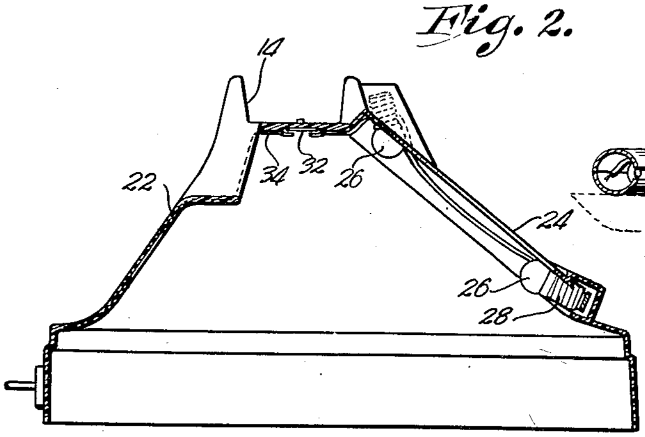
Fig. 3 is a cross-sectional view taken on line III—III of Fig. 2.

The movable contact of the switch 32 is disposed for movement to an open position by the hand-set 16 as illustrated in Fig. 4 of the drawing, when hand-set 16 is placed within cradle 14 of stand 12. Conversely, the movable contactor of switch 32 being normally biased toward the closed position, automatically closes the circuit through the lamps 26 whenever the hand-set 16 is removed from its normal resting position in cradle 14. Consequently, whenever the telephone set 10 is placed in use by removing hand-set 16 and thereupon dialing through finger wheel 20, the dial 18 will be fully illuminated and the user can readily distinguish the conventional calibrations on dial 18.

Figure 5:
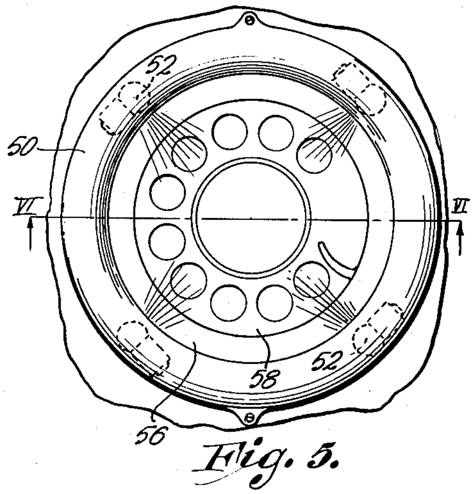
Fig. 5 is a fragmentary, face view illustrating a modified form of the invention.
Figure 6:
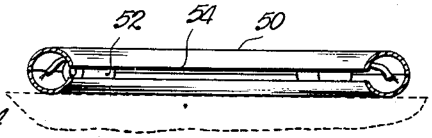
Fig. 6 is a cross-sectional view taken on line VI—VI of Fig. 5.

As a possible modification of the assembly just above described, there is provided in Figs. 5 and 6 an annular tube 50 for supporting a plurality of lamps 52 of the same nature as lamps 26. The tubular member 50 circumscribes the opening 24 of cover 22 and may either be formed integrally as a part thereof or be separately manufactured and joined to the cover 22 in any suitable manner. The tubular annulus 50 is provided with an internal continuous slot 54 disposed to confine the rays of light to a dial 56 below a rotatable finger wheel 58. As shown in Fig. 6, the slot 54 is preferably disposed with its center slightly below the central plane of the annulus 50, in order to accomplish the desired confinement of the rays of light to the dial 56. By so offsetting the slot 54 below the locus plane containing the cross-sectional centers of the tubular annulus 50, it is obvious that light from the lamps 52 is shaded from direct incidence upon the eyes of one using the telephone set. It is to be preferred that the annulus 50 be made of an opaque material so that the radiations from lamps 52 are confined through slot 54 to the upper surface of dial 56.

It is noted in Fig. 1 that a stand 12 has been shown for illustration of the kind having the finger wheel 20 raised above the supporting surface of stand 12 therefor and that even the dial 18 of stand 12 is slightly raised. In Fig. 5 of the drawing, however, there is illustrated a telephone stand wherein the dial 56, as well as the finger wheel 58, is entirely confined within the stand 12 proper presenting a smooth, flat surface across the front of the stand and across the finger wheel 58.

The form of my invention shown in Figs. 5 and 6 is particularly adapted for a stand of this last mentioned character because of the fact that the tubular annulus 50 and its slot 54 more effectively confine the light emanations of lamps 52 to the calibrations on dial 56 below finger wheel 58.

Many changes and modifications may manifestly be made to either of the two forms chosen to illustrate the present invention and those that fairly come within the spirit of this invention as defined by the scope of the appended claim, are contemplated hereby.

Having thus described the invention, what is claimed as new and desired to be secured by Letters Patent is:

For a telephone set having a hand-set and a subscriber's telephone stand including a cradle for the hand-set, a calling dial and a rotatable finger wheel associated with said dial, a cover for said stand provided with a clearance opening for the dial and finger wheel thereof; an electrical lighting circuit including a plurality of lamps carried by the cover and spaced around the opening for directing rays of light radially inwardly across the normally uppermost surface of the dial; and a unitary, opaque annular tube of circular cross-section forming a part of said cover and defining said opening, said tube being mounted on the cover in coaxial relationship with said wheel, said tube having a single, continuous and uninterrupted slot of uniform width in the innermost edge thereof adjacent the dial, said lamps being within the tube said slot being disposed with its center below the central plane of the tube, whereby rays of light from the lamps are directed upon said dial and are confined against direct incidence upon the eyes of a person using the telephone set.

References Cited in the file of this patent

UNITED STATES PATENTS

| Number | Name | Date |
|---|---|---|
| 1,759,205 | Peyton | May 20, 1930 |
| 1,850,642 | Strock | Mar. 22, 1932 |
| 2,480,393 | Bossert et al. | Aug. 30, 1949 |
| 2,516,676 | Caroselli | July 25, 1950 |

FOREIGN PATENTS

| Number | Country | Date |
|---|---|---|
| 59,956 | Denmark | Feb. 15, 1941 |